United States Patent [19]

Kohler et al.

[11] Patent Number: 5,322,123

[45] Date of Patent: Jun. 21, 1994

[54] USE OF GEL-BASED COMPOSITIONS FOR REDUCING THE PRODUCTION OF WATER IN OIL- OR GAS-PRODUCING WELLS

[75] Inventors: Norbert Kohler, Villennes sur Seine; Rosangela Pirri, Montardon, both of France

[73] Assignee: Institut Francais Du Petrole, Rueil Malmaison, France

[21] Appl. No.: 920,444

[22] PCT Filed: Oct. 28, 1991

[86] PCT No.: PCT/FR91/00850

§ 371 Date: Aug. 20, 1992

§ 102(e) Date: Aug. 20, 1992

[87] PCT Pub. No.: WO92/08038

PCT Pub. Date: May 14, 1992

[30] Foreign Application Priority Data

Oct. 28, 1990 [FR] France .................. 90 13385
Aug. 28, 1991 [FR] France .................. 90 10758

[51] Int. Cl.$^5$ .................................... F21B 33/138
[52] U.S. Cl. ................................ 166/295; 166/294; 252/8.551; 252/315.3
[58] Field of Search ............... 166/294, 295, 300, 308; 252/8.551, 315.3; 523/130

[56] References Cited

U.S. PATENT DOCUMENTS

| | | | |
|---|---|---|---|
| 4,460,751 | 7/1984 | Hanlon et al. | 525/371 |
| 4,470,915 | 9/1984 | Conway | 166/308 X |
| 4,640,358 | 2/1987 | Sampath | 252/315.3 X |
| 4,706,754 | 11/1987 | Smith | 166/300 X |
| 4,718,491 | 1/1988 | Kholer et al. | 166/294 |
| 4,917,186 | 4/1990 | Mumallah | 166/295 |
| 4,953,621 | 9/1990 | Putzig et al. | 252/8.551 X |
| 5,131,469 | 7/1992 | Lockhart et al. | 166/295 |

FOREIGN PATENT DOCUMENTS

| | | |
|---|---|---|
| 0104927 | 4/1984 | European Pat. Off. . |
| 0302544 | 2/1989 | European Pat. Off. . |
| 0383337 | 8/1990 | European Pat. Off. . |
| 0390282 | 10/1990 | European Pat. Off. . |
| 2187773 | 9/1987 | United Kingdom . |

*Primary Examiner*—George A. Suchfield
*Attorney, Agent, or Firm*—Millen, White, Zelano, & Branigan

[57] ABSTRACT

The invention has as its object the use of new composition of gels that can be used for the reduction of the production of water in oil- or gas-producing wells.

The compositions of gels comprise a solution of at least one water-soluble complex of a polyvalent metallic cation such as zirconium lactate able to cross link a nonionic polysaccharide such as scleroglucan, at a concentration of 2 to 10,000 parts per million of parts, expressed by weight of metal dioxide. With a preferred concentration of 2 to 100 ppm, the oil permeability is not appreciably affected.

The compositions make possible the formation of aqueous gels of scleroglucan that can be used for the prevention of inflows of water into the hydrocarbon-producing wells.

16 Claims, No Drawings

USE OF GEL-BASED COMPOSITIONS FOR REDUCING THE PRODUCTION OF WATER IN OIL- OR GAS-PRODUCING WELLS

BACKGROUND OF THE INVENTION

This invention has as its object the use of new crosslinking compositions for polysaccharides, in particular scleroglucan. It also relates to the use of aqueous gels including these crosslinking compositions for the selective reduction of the production of water in oil- or gas-producing wells. They exhibit a particularly great advantage when the permeability of the formation treated in the vicinity of the wells is high and/or when the water produced is hot and/or salty, for example at a formation temperature of 70° to 130° C. and/or a salinity of the water produced at least equal to that of sea water (at least 30 g/l, expressed in NaCl). These new compositions are particularly applicable to the enhanced recovery of hydrocarbons.

The recovery of the liquid or gaseous hydrocarbons of subterranean formations is very frequently accompanied by the production of large quantities of water. In some cases, although significant productions of hydrocarbons are obtained, the production of water is so considerable and the costs for treating the water so high that the production of hydrocarbons is not economical. In heterogeneous reservoirs, the excessive production of water is often caused by the fingering of the water injected through the zones of high permeability. This leads to a premature breakthrough of the water to the production well, to a poor volumetric sweep and finally to an ineffective recovery of the hydrocarbons.

Many methods intended to reduce the production of water of the very permeable formations have been proposed and tested in the field; they generally involve introducing into the formation, at the level of the zone to be isolated, either a cement or a suspension of solid particles or of paraffins. Resins or gels of water-soluble polymers have more recently been proposed and put into use. All these processes exhibit the disadvantage of not being selective and of blocking the circulation of the oil or gas almost as much as that of the water.

More recently, the use of water-soluble polymers of high molecular weight in the absence of any crosslinking or coupling agent has been proposed, polymers which exhibit the advantage, relative to the preceding solutions and in particular those which use resins or gels of polymers, of reducing the circulation of the water without affecting the production of oil or gas in a troublesome way.

Among these water-soluble polymers, nonionic polysaccharides and in particular scleroglucan have proved particularly effective in reducing selectively the production of water of production wells while maintaining the production of hydrocarbons. Thus, U.S. Pat. No. 4,718,491 and patent application FR 89/1716 of the applicant recommend the use of different polysaccharides, and in particular of a scleroglucan, in the absence of any crosslinking or coupling additive, for the selective reduction of the permeability in the vicinity of an oil- or gas-producing well. If the preferred range of application of these polymers covers the productions of hot (up to 130° C.) and Salty water, its effectiveness decreases when the permeability of the formation becomes high and in particular if it is greater than 1 Darcy.

French patent application 90/13385 describes a crosslinking composition comprising at least one water-soluble complex having a base of polyvalent metallic cation and of complexing organic acid of the cation able to crosslink a polysaccharide, in particular scleroglucan.

U.S. Pat. No. 4,647,312 furthermore recommends the use of scleroglucan complexes and a polyvalent metal ion such as titanium, zirconium and chromium for the production of fluids of very high viscosity and their use in enhanced recovery of oil. Although no mention is made in this patent of the ability of these gels to propagate in a subterranean formation, the increase in viscosity obtained shows that it is strong gels which should not have any selective character and therefore reduce the production of water as much as that of the hydrocarbons. In addition, it is suggested to use zirconium tetrachloride, but the latter exhibits the drawback of being insoluble in a water with a salinity close to that of seawater.

SUMMARY OF THE INVENTION

The object of this invention eliminates the cited drawbacks and therefore relates to the use of new compositions of gels for the selective reduction of the production of water in oil- or gas-producing wells.

More specifically, the invention relates to a process for the selective reduction of water permeability in an oil- and/or gas-producing subterranean formation in which a composition of aqueous gels is injected through at least one hydrocarbon-producing well into the formation surrounding the producing well at a suitable flow rate and/or at a suitable pressure and the well is put back into production, characterized in that said composition of aqueous gels comprises a solution of at least one nonionic polysaccharide and at least one complex having a base of a water-soluble polyvalent metallic cation and of a complexing organic acid of the cation, able to crosslink said polysaccharide, said complex having a concentration, expressed by weight of metal dioxide, of 2 to 100 parts per million of parts of the solution.

Advantageously, zirconium Zr(IV) or titanium Ti(IV) is used. The organic acid advantageously recommended is an alphahydroxylated acid.

Among the alphahydroxylated organic acids, more particularly an alphahydroxycarboxylic acid such as lactic acid or malic acid is selected.

Excellent results in terms of selectivity have been obtained when the acid is lactic acid and the cation is zirconium.

Among the polysaccharides meeting the criteria of the invention, the nonionic polysaccharides such as glucans and in particular scleroglucan and schizophyllan, galactomannane gums such as for example guar gum and in particular its substitution derivatives such as for example hydroxypropylguar and carboxymethylguar and their mixtures are preferred.

Among the nonionic polysaccharides of the invention, the preference is given to scleroglucan. The latter is a nonionic branched homopolysaccharide whose main chain consists of series of patterns of $\beta$1-3 D-glucose type, substituted every third pattern by a $\beta$1-6 D-glucose unit. Scleroglucan is obtained by fermentation of media containing carbohydrates initiated by Sclerotium fungi and particularly by a fungus of the Sclerotium Rolfsii type (ATCC 15206).

The zirconium or titanium complexes able to form a gel in aqueous medium with scleroglucan are advantageously zirconium or titanium complexes having a base of malic or lactic acids, the alphahydroxycarboxylic acid/zirconium or titanium molar ratio preferably being between 0.5 and 4 and more particularly between 2 and 4 with lactic acid and 0.5 and 1.5 with malic acid. It is possible to cite by way of example the commercial products sold by SCPI (Société des Produits Chimiques Industriels) [Industrial Chemical Products Company] under the names "ZIRCOMPLEX PN" or "ZIRCOMPLEX PA" or further by the ZIRTECH company based in Gainesville, Fla. under the name "ZIRTECH LA".

The concentrations by weight of polymer for the obtaining of gels according to the invention generally vary between 150 and 5000 ppm and preferably between 200 and 2000 ppm.

The concentrations by weight of polyvalent metal complex and preferably of titanium or zirconium, expressed by weight of metal oxide, vary between 2 and 100 ppm, advantageously 3 to 95 ppm and preferably between 5 and 25 ppm. Concentrations of 100 to 10,000 ppm by weight of metal oxide can even be used, advantageously of 120 to 8000 ppm, and preferably of 1000 to 5000 ppm in certain applications relating to very permeable or fractured reservoirs where the zones producing water and hydrocarbons are very clearly separated.

By aqueous medium is meant water with all the constituents able to be dissolved there, i.e. the salts, but also other additives necessary for an application such as basic constituents such as soda, or else surface-active agents or bactericides.

The composition according to the invention, particularly in the range of recommended concentrations (2–100 ppm) can be used to reduce selectively the water permeability in a production well without appreciably affecting the hydrocarbon permeability. Actually, after having found at the level of these wells that more water than oil was produced, essentially through the zones of higher permeability, the pumping or the production system of these wells is stopped and the composition according to the invention is injected into said wells particularly when the range of concentrations of metal oxide corresponds to the formation of a weak gel (2–100 ppm).

After injection of a volume corresponding to a radial extension of the composition of 1 to 30 meters from these wells, optionally followed by a closing time of several days to facilitate on the one hand, the adsorption of the polymer and on the other hand, to make it possible for the gelling reaction to reach its completion, said wells are put back in production and it is found that while producing less water through the zones of high permeability, the production of hydrocarbons through the zones of slight permeability is increased. Putting the wells back into production is generally performed gradually and as much as possible at flow rates and/or pressures equal to or less than those which had been used for the injection of the aqueous composition.

A first method of putting the formulation in place according to the invention consists in mixing simultaneously all the constituents of the gel in the well head and in injecting them simultaneously into the formation. The gelling reaction then occurs within the formation to be treated. This method is applied very particularly when it is desired to form a weak gel in a zone of the formation producing water and hydrocarbons simultaneously.

A second method of putting the formulation in place according to the invention, and corresponding to the use of strong gels in a zone of the formation essentially producing water, consists in making alternate successive injections first of crosslinking solution and then of polymer. Thus by successive crosslinkings, an adsorbed multilayer of polymer is produced by the crosslinking agent that can go up to the formation of a compact gel with plugging of the water-producing zone.

Preferably the injection of the nonionic polysaccharide mixture and of crosslinking complex into the producing well is performed at a flow rate and/or a pressure that is sufficient to enable easy introduction into the subterranean formation but at a pressure less than the layer limit pressure or breakdown pressure.

By sufficient flow rate and/or pressure is meant a flow rate and/or a pressure corresponding to a shear gradient of at least 50 s$^{-1}$. The viscosity of the polysaccharide-crosslinking complex mixture at this gradient is preferably less than 10 mPa.s, for example 1 to 9 mPa.s (1 mPa.s = 1 cP).

To use the formulation according to the invention and its injection into a hydrocarbon-producing well, work is performed advantageously at a pH less than 9, the value of the pH depending nevertheless on the temperature of the reservoir to be treated. For applications at high temperature, the formulation at a pH close to neutrality is injected.

The examples which follow are intended to illustrate the various advantages connected with the use of the formulations according to the invention. They comprise tests of test specimens making possible the establishment of the sol/gel phase diagrams as well as tests of placing in porous medium under conditions as close as possible to those existing in the oil-yielding formation.

EXAMPLES

Tests of Test Specimens

Example 1

Tests in tubes were performed first on raw solutions of powder scleroglucan, "ACTIGUM CS 11 PVE" of the company SANOFI BIOINDUSTRIES, FRANCE, in water containing 50 g/l of NaCl. Different solutions at increasing concentrations of polymer (of 125 ppm to 3000 ppm) were prepared, their viscosity measured with an LS 30 viscometer of the CONTRAVES company for a shear gradient of 10 s$^{-1}$. Increasing concentrations (5 to 100 ppm) of ZrO$_2$ of "ZIRTECH LA" (7% by weight of ZrO$_2$) produced by the company ZIRTECH, USA were added to each of these polymer solutions.

The solutions were aged for 5 days in an oven thermoregulated at 30° C., the viscosities measured again. In table 1, opposite each concentration of polymer are reproduced the minimum quantities of zirconium complex necessary to obtain an increase of viscosity of at least 50% of the polymer solution as a result of a gelling reaction at 30° C. It should be noted that as a result of the addition of the zirconium complex, the pH of the polymer solution gradually changes from 6.5 to 7.3. Furthermore, no gelling or appreciable increase of viscosity is observed for concentrations of polymer less than 150 ppm (covering concentration).

TABLE 1

Establishment of the sol/gel diagram for the zirconium lactate-scleroglucan pair (after 5 days at 30° C.)

| Scleroglucan (ppm) | $ZrO_2$ (ppm) |
|---|---|
| 125 | no gelling |
| 250 | 15 |
| 500 | 10 |
| 1000 | 15 |
| 2000 | 30 |
| 3000 | 50 |

Example 2

The tests in tubes of example 1 were renewed except that the different samples were aged in an oven thermoregulated at 80° C. and the viscosities were measured at the end of 3 days at this temperature. The results of table 2 show that the minimum concentrations of zirconium lactate are approximately the same at 80° C. and at 30° C. but that the reaction kinetics is notably higher at 80° C. (measurements after 3 days instead of 5 days in example 1).

TABLE 2

Establishment of the sol/gel diagram for the zirconium lactate-scleroglucan pair (after 3 days at 80° C.)

| Scleroglucan (ppm) | $ZrO_2$ (ppm) |
|---|---|
| 125 | no gelling |
| 250 | 15 |
| 500 | 15 |
| 1000 | 20 |
| 2000 | 30 |
| 3000 | 50 |

Example 3

The tests in tubes of the preceding examples were renewed this time by dispersing hydroxypropylguar powder, "GALACTASOL 476" of the AQUALON company, France, in water containing 50 g/l of NaCl. An appreciable increase of the viscosity corresponding to a gelling of the polymer solution is observed after 3 days at 30° C. and 1 day at 80° C. for solutions containing respectively 2000 or 3000 ppm of polymer and of "ZIRCOMPLEX PA" of the Société des Produits Chimiques Industriels (SCPI) titrating 5 ppm of $ZrO_2$. We note that if in these tests performed at a pH of 7, the pH is increased to 9 by addition of a base, an almost instantaneous gelling of the polymer solutions is obtained even at ambient temperature.

Tests in Porous Medium

Examples 4 to 8

To test according to the invention the effectiveness of the weak gel-based formulations to reduce water permeability without affecting the hydrocarbon permeability, there was applied to various porous mediums the experimental procedure described in the communication of A. Zaitoun and N. Kohler to the Society of Petroleum Engineers under the reference SPE 18085 of October 1988 and comprising the follow stages:

1. Saturation of the porous medium with brine and determination of initial water permeability $k_{wi}$.
2. Injection of oil up to irreducible water saturation $S_{wi}$.
3. Injection of brine up to irreducible oil saturation $S_{or}$.
4. Operations 2 and 3 are repeated until the extreme values of relative permeabilities $k_{rw}$ and $k_{ro}$ are reproducible.
5. At the irreducible oil saturation, injection of the polymer alone (reference) or the polymer+cross-linking agent. Stopping of the circulation of the fluids to make it possible for the gelling reaction to reach its completion.
6. Injection of brine until all of the nonadsorbed polymer is displaced. It is verified that the viscosity of the effluent corresponds to that of the brine. The reduction curve of water permeability $R_{kw}$ is plotted as a function of the flow rate or shear gradient $\gamma$.
7. Injection of oil up to irreducible water saturation $S_{wi}$. Determination of the new value of $k_{ro}$ at high flow rate (Welge method).
8. Injection of water up to $S_{or}$ and determination of the new value of $k_{rw}$ at high flow rate.

Shear gradient $\gamma$ in porous medium is calculated as follows:

$$\gamma = \frac{4v}{r}$$

where v is the surface velocity calculated by:

$$v = \frac{4q}{S \phi (1 - S_{or})}$$

where q is the injection flow rate, S the surface of the input face of the porous medium, $\phi$ the porosity r the average radius of the pores calculated by:

$$r = \frac{8k\, k_{rw}}{\phi (1 - S_{or})}$$

where k is the initial water permeability of the porous medium.

The reduction of brine permeability $R_{kw}$ is a measurement of the apparent viscosity of the brine circulating in the porous medium after putting the polymer or the gel in place.

The measurements of relative permeabilities $k_{rw}$ and $k_{ro}$, made at the same saturation condition $S_w$ and for the same flow rate q, correspond to load losses due to the circulation of the fluids, water or oil, before and after putting the polymer or the gel in place.

Example 4

The first experiment of putting the formulation according to the invention in place was performed on a Vosges sandstone core sample inserted in a Hassler cell, the whole being put in an oven at 95° C. Pressure sensors make it possible to measure the load losses at the boundaries of the core and a positive-displacement pump makes it possible to inject the fluids at a constant flow rate.

Initial water permeability $k_{wi}$ (140 g/l of total salinity) was found equal to 1.5 D. Successively, the injection of oil ($\mu$=1.97 cP at 95° C.) was performed up to its irreducible water saturation and the relative oil permeability ($k_{ro}$=0.92, $S_{wi}$=0.34 and $k_{ro}$=0.28, $S_w$=0.48) was measured, then the water injection was performed up to irreducible oil saturation and the relative water permeability ($k_{rw}$=0.05, $S_{or}$=0.46) was measured.

Then the injection was performed of a solution at 1.5 g/l of powder scleroglucan, "ACTIGUM CS 11 PVE" of the company SANOFI BIOINDUSTRIES, dispersed in salt water at the flow rate q=20 cm³/hr. The adsorption of the polymer was found equal to 120 µg/g.

The injection of brine was then performed to displace the nonadsorbed polymer and the reduction of water permeability $R_{KW1}$ was then measured at different water injection flow rates (table 3).

The core sample was then saturated using a mixture of scleroglucan (Cp=1.5 g/l) and zirconium complex, "ZIRTECH LA" ($C_{ZrO2}$=30 ppm), a mixture which gives rise to a tube gelling reaction at a temperature of 95° C., and all circulation of fluid was stopped for 16 hours. The surplus of the mixture which was not absorbed or which had not reacted was displaced by water injection and a new measurement of the reduction of water permeability was performed at various flow rates $R_{KW2}$ (table 3).

TABLE 3

Vosges sandstone at 95 and 120° C.
Reductions of water permeability after polymer alone ($R_{KW1}$)
and after polymer + zirconium lactate ($R_{KW2}$)

| Flow rate q(cm³/hr) | Shear Gradient γ(s⁻¹) | $R_{KW1}$ polymer alone | $R_{KW2}$ polymer + Zr complex |
|---|---|---|---|
| 4 | 12.4 | 5.00 | 64.3 |
| 10 | 31 | 3.80 | 42.4 |
| 30 | 93 | 3.13 | 24.9 |
| 50 | 155 | 2.76 | 12.1 |

It is found that the values of reduction of water permeability after water injection of the mixture according to the invention are largely greater than those measured after injection of polymer alone.

Moreover, it is possible to show by using the Welge method that the relative oil permeability ($k_{ro}$=0.24, $S_w$=0.48) is not affected by the presence of the weak gel whereas the relative water permeability ($k_{rw}$=0.011, $S_w$=0.54) is greatly reduced relative to the initial permeability ($k_{rw}$=0.05 at the same water saturation value).

The formulation according to the invention therefore greatly reduces the water permeability without appreciably affecting the oil permeability. The system therefore is selective.

The temperature of the oven was then brought to 120° C. to test the stability of the formulation at this temperature in porous medium. Synthetic seawater, carefully deoxygenated by addition of 100 ppm of sodium sulfite, was continuously injected under a nitrogen atmosphere at a flow rate of 1 ml/hr in the porous medium and the pressures measured daily for 14 days at 120° C. It was found that the value of permeability reduction measured at this flow rate ($R_k$=103) proved particularly stable during this experiment (final value ($R_k$=95).

The formulation according to the invention therefore makes it possible to reduce the water permeability even at this temperature for rather extended times.

Example 5

The preceding experiment was renewed this time by using a core sample of sand of "ENTRAIGUES EN 38" reconstituted in a Hastelloy stainless steel cell, the whole placed in an oven at 80° C.

The relative water permeability (reconstituted seawater) of the core sample was found equal to 2.32 D. Successively, the injection of oil (µ=2.43 cP at 80° C.) up to irreducible water saturation was performed and, as before, the relative oil permeability was measured for 2 water saturation values ($k_{ro}$=0.615, $S_w$=0.30 and $k_{ro}$=0.22, $S_w$=0.43). As a result of the water injection, the initial values of relative water permeability were determined ($k_{rw}$=0.30, $S_w$=0.79).

The injection of a solution of scleroglucan (Cp=1.5 g/l) in seawater gives rise to an irreversible adsorption of the latter equal to 80 µg/g.

As a result of the water injection and the total displacement of the nonadsorbed polymer, the values of permeability reduction $R_{KW1}$ of table 4 are observed.

TABLE 4

Entraigues sand at 80° C.:
Reductions of water permeability after polymer alone ($R_{KW1}$)
and after polymer + zirconium lactate ($R_{KW2}$)

| Flow rate q(cm³/hr) | Shear Gradient γ(s⁻¹) | $R_{KW1}$ polymer alone | $R_{KW2}$ polymer + Zr complex |
|---|---|---|---|
| 10 | 10.2 | 4.39 | 179.8 |
| 20 | 20.4 | 2.74 | 118.0 |
| 30 | 30.6 | 2.30 | 95.8 |
| 50 | 51 | 1.97 | 74.1 |
| 100 | 102 | 1.75 | 57.7 |
| 200 | 204 | 1.48 | 45.0 |

Then the injection was performed of a formulation according to the invention containing 1.5 g/l of powder scleroglucan and 25 ppm of zirconium complex "ZIRCOMPLEX PA" of the SCPI titrating 7.3% by weight of $ZrO_2$, a formulation able to form a weak gel at 80° C., and all circulation of fluid was stopped for 16 hours.

Then, as before, the injection of water and the measurement of the reduction of water permeability at different flow rates $R_{KW2}$ (table 4) were performed. Here also the values obtained are largely greater than those resulting from the adsorption of the polymer alone.

The selectivity of the system is proved by comparing the relative oil and water permeabilities before and after putting the weak gel in place (Welge method). The relative water permeability $k_{rw}$ thus goes from an initial value equal to 0.30 to a final value equal to 0.012 for the same saturation condition $S_w$=0.79. The relative oil permeability $k_{ro}$ goes from an initial value equal to 0.22, $S_w$=0.43 to a final value very close to 0.17 at the same saturation condition.

The selectivity of the formulation according to the invention is thus again demonstrated.

Example 6

The preceding experiments were conducted again, this time using a porous medium consisting of St. Waast les Mello limestone inserted in a Hassler cell and put in the oven at 80° C.

The initial seawater permeability was found equal to 931 mD. The porous medium was put in residual oil (µ=2.40 cP) and the seawater permeability in the presence of residual oil $k_{SOR}$ was found equal to 157 mD.

As before, the injection of a solution of powder scleroglucan (Cp=1500 ppm) that is used as a reference was performed, then the injection of a mixture of polymer (Cp=1500 ppm) and "ZIRTECH LA" ($C_{ZrO2}$=24 ppm) was performed. After a stop of 19 hours at 80° C., the values of reduction of water permeability were measured.

Table 5 gathers the results of reduction of water permeability after respective putting in place of the polymer alone, then the formulation according to the invention.

An aging test was also performed by injecting seawater at a low flow rate for 13 days at 80° C. and by performing a daily measurement of the reduction of water permeability. Table 5 shows that the values obtained are perfectly stable over time ($R_{KW3}$).

In the same way as before, it is demonstrated that the weak gel is selective in carbonated medium, greatly reducing the water permeability without changing the oil permeability to a great extent.

TABLE 5

St. Waast les Mello limestone at 80° C.
Reductions of water permeability after polymer alone ($R_{KW1}$) and after polymer + zirconium lactate ($R_{KW2}$) and after ($R_{KW3}$) aging

| Flow rate q(cm³/hr) | Shear Gradient γ(s⁻¹) | $R_{KW1}$ polymer alone | $R_{KW2}$ polymer + Zr complex | $R_{KW3}$ |
|---|---|---|---|---|
| 2 | 4.9 | 11.80 | 64.6 | 103.50 |
| 10 | 24.5 | 4.48 | 23.54 | 24.95 |
| 20 | 49 | 3.98 | 16.66 | 16.67 |
| 50 | 122.5 | 3.30 | 11.52 | 12.53 |
| 100 | 245 | 3.01 | 9.50 | 10.3 |

Example 7

In a core sample of Entraigues sand put in an oven at 50° C. and whose synthetic seawater permeability (30 g/l of NaCl and 3 g/l of $CaCl_2 \cdot 2H_2O$) was found equal to 4.8 D, the injection was performed of a solution at 2500 ppm of hydroxypropylguar, "GALACTOSOL 476" of the AQUALON Company, in seawater at a flow rate of 20 ml/hr. This injection of polymer was followed by injection of seawater to displace the nonadsorbed excess polymer and a reduction of water permeability of 1.8 was measured that was practically independent of the water injection flow rate. In the same core sample, there was then performed at the same flow rate of 20 ml/hr the injection of a mixture in synthetic seawater containing 2500 ppm of hydroxypropylguar, 10 ppm of "ZIRCOMPLEX PN" (titrating 9.9% by weight of $ZrO_2$) and 100 ppm of citric acid and after a stopping of circulation for one night at 50° C. there was performed as before the injection of synthetic seawater to displace the excess polymer. The final reduction of seawater permeability was found equal to 290 at this same flow rate of 20 ml/hr.

Example 8

In a core sample of Entraigues sand at 80° C. saturated in synthetic seawater and whose permeability was found equal to 4.3 D, the alternate injection was performed of 1.5 porous volume of a solution of "ZIRCOMPLEX PN" (titrating 1000 ppm of $ZrO_2$) in seawater at a flow rate of 50 ml/hr followed by 1.5 porous volume of a solution of scleroglucan (Cp=500 ppm) in seawater. All circulation was stopped for 24 hours to enable the gelling reaction to take place. Then the injection of seawater was performed at the same flow rate of 50 ml/hr and it was found that the load losses at the boundaries of the porous medium were greatly increased and that the seawater permeability had become very slight. By calculation, a reduction of water permeability greater than 1000 is obtained.

The alternate injection of crosslinking agent and of polymer considerably reduces the water permeability as a result of the formation of a strong gel. An oil injection test in this porous medium also gives rise to very high load losses thus showing that the formulation used is no longer selective and blocks both the passage of water and that of oil.

We claim:

1. A process for the selective reduction of water permeability in a subterranean formation, and producing oil and/or gas therefrom, said process comprising injecting a composition of aqueous gels at near neutral pH through at least one hydrocarbon-producing well into the formation surrounding a producing well at a flow rate and/or at a pressure corresponding to a shear gradient of at least 50 s⁻¹ and the well is put back into production, wherein said composition of aqueous gels consists essentially of a solution of at least one nonionic polysaccharide, which is a glucan, galactomannane gum or a mixture thereof, and at least one complex of a water-soluble polyvalent metallic cation which is zirconium or titanium and an alphahydroxyl complexing organic acid of the cation, able to crosslink said polysaccharide, said complex having a concentration, expressed by weight of metal dioxide, of 2 to 100 parts per million of parts of the solution, whereby the permeability of the formation of water is reduced without significantly reducing the permeability to hydrocarbons.

2. A process according to claim 1, wherein the nonionic polysaccharide is scleroglucan.

3. A process according to claim 1, wherein the complexing organic acid of the cation is lactic acid or malic acid.

4. A process according to claim 1, wherein the concentration of the complex is 3 to 95 ppm, so that the water permeability is greatly reduced without the oil permeability being appreciably affected.

5. A process according to claim 1, wherein the concentration of the complex is 100 to 10,000 ppm, when the subterranean formation is fractured or very permeable.

6. A process according to claim 1, wherein the concentration of the complex is 5 to 25 ppm.

7. A process according to claim 1, wherein the water of the subterranean formation is at a temperature of 70° to 130° C.

8. A process according to claim 1, wherein the viscosity of the composition is less than 10 mPa.s at said shear gradient.

9. A process according to claim 1, wherein the complexing organic acid of the cation is lactic acid.

10. A process according to claim 9, wherein the lactic acid/zirconium molar ratio is between 2 to 4.

11. A process according to claim 1, wherein the complexing organic acid of the cation is malic acid.

12. A process according to claim 14, wherein the malic acid/titanium molar ratio is between 0.5 and 1.5.

13. A process according to claim 1, wherein the concentration of the complex is 3 to 95 ppm so that the water permeability is greatly reduced without the oil permeability being appreciably affected.

14. A process according to claim 1, wherein the concentration of the complex is 120 to 8000 ppm when the subterranean formation is fractured or very permeable.

15. A process for the selective reduction of water permeability in a subterranean formation, and producing oil and/or gas therefrom, said process comprising injecting a composition of aqueous gels at near neutral pH through at least one hydrocarbon-producing well into the formation surrounding a producing well at a flow rate and/or at a pressure corresponding to a shear gradient of at least 50 s$^{-1}$ and the well is put back into production, wherein said composition of aqueous gels consists essentially of a solution of at least one nonionic polysaccharide, which is a glucan, and at least one complex of a water-soluble polyvalent metallic cation which is zirconium or titanium and an alphahydroxyl complexing organic acid of the cation, able to crosslink said polysaccharide, said complex having a concentration, expressed by weight of metal dioxide, of 2 to 100 parts per million of parts of the solution, whereby the permeability of the formation of water is reduced without significantly reducing the permeability to hydrocarbons.

16. A process for the selective reduction of water permeability in a subterranean formation, and producing oil and/or gas therefrom, said process comprising injecting a composition of aqueous gels at near neutral pH through at least one hydrocarbon-producing well into the formation surrounding a producing well at a flow rate and/or at a pressure corresponding to a shear gradient of at least 50 s$^{-1}$ and the well is put back into production, wherein said composition of aqueous gels consists essentially of a solution of at least one nonionic polysaccharide, which is a glucan, galactomannane gum or a mixture thereof, and at least one complex of a water-soluble polyvalent metallic cation which is zirconium or titanium and an alphahydroxyl complexing organic acid of the cation, able to crosslink said polysaccharide, said complex having a concentration, expressed by weight of metal dioxide, of 2 to 100 parts per million of parts of the solution, whereby the permeability of the formation to water is reduced without significantly reducing the permeability to hydrocarbons, with the proviso that the composition of aqueous gels does not contain amine compounds.

* * * * *